No. 659,481. Patented Oct. 9, 1900.
W. KESSELRING & E. RÖTHENBACHER.
TRAP OR SIPHON FOR DRAINS OR THE LIKE.
(Application filed Feb. 12, 1900.)
(No Model.)
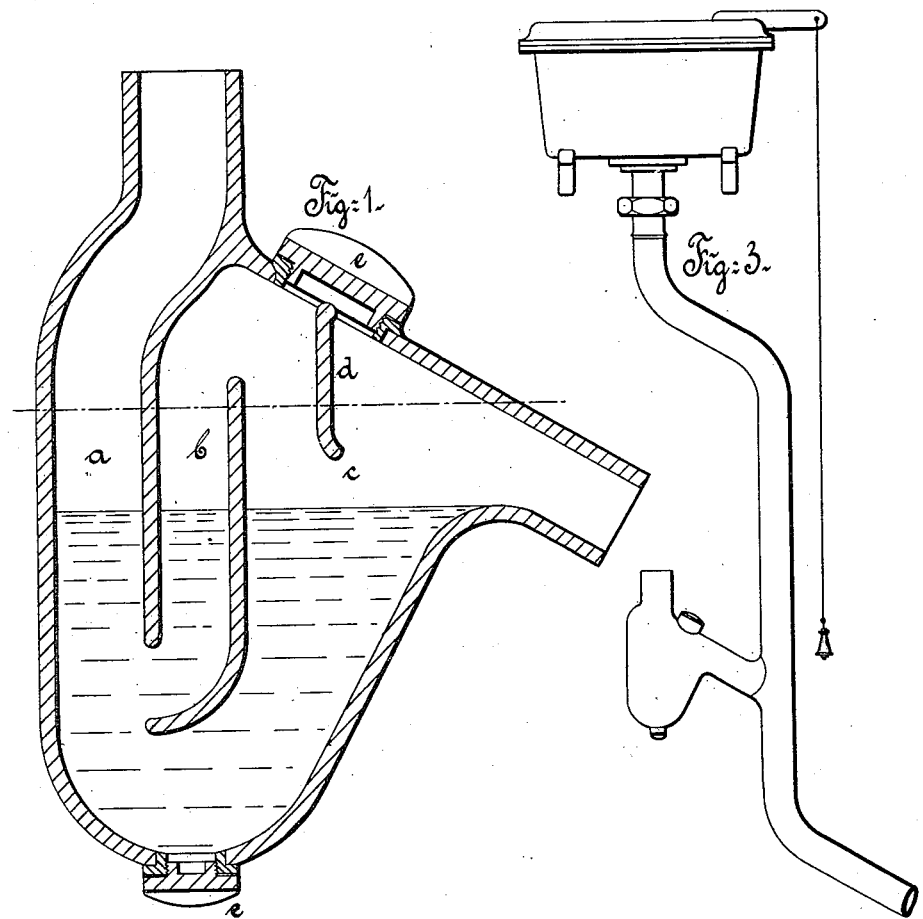
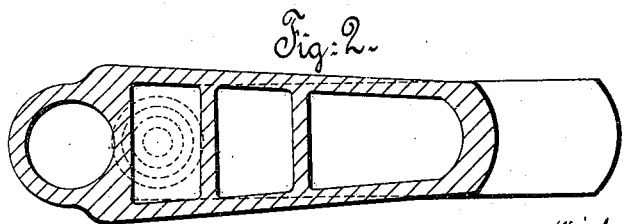

UNITED STATES PATENT OFFICE.

WILHELM KESSELRING AND EMIL RÖTHENBACHER, OF STRASBURG, GERMANY.

TRAP OR SIPHON FOR DRAINS OR THE LIKE.

SPECIFICATION forming part of Letters Patent No. 659,481, dated October 9, 1900.

Application filed February 12, 1900. Serial No. 4,893. (No model.)

*To all whom it may concern:*

Be it known that we, WILHELM KESSELRING and EMIL RÖTHENBACHER, contractors, subjects of the Emperor of Germany, residing at 35 Schiffleutstaden, Strasburg, in the Empire of Germany, have invented certain new and useful Improvements in Traps or Siphons for Drains or the Like, of which the following is a specification.

This invention relates to intercepting traps or siphons for drains or the like, the object being to provide a device for preventing the water constituting the joint from being drawn out of the trap by suction; and it consists, essentially, in providing a passage within the trap between the inlet-chamber and the widened outlet-chamber, which passage is in communication, on the one hand, with the lower portion of the inlet-chamber, the distance of its mouth from the bottom of the trap being approximately equal to the width of the inlet-chamber, and, on the other hand, with the outlet-chamber and above the discharge-level thereof. This passage places the upper portion of the outlet-chamber in communication with the atmosphere when the quantity of water in the outlet-chamber exceeds the quantity in the inlet-chamber, the effect of this being that the pressure of the air produces a cessation of the siphon action before water is withdrawn from the trap by suction to such an extent as to prevent an efficient water joint from being again formed.

In order that our invention may be readily understood and carried into effect, we will describe the same more fully, reference being made to the accompanying drawings, in which—

Figure 1 represents a vertical section through our improved intercepting-trap; Fig. 2, a horizontal section through the same, and Fig. 3 a diagrammatic view illustrating the connection of the trap with the down-pipe.

The inlet-chamber $a$ is approximately of the same cross-section as the inlet-pipe, and its lower portion forms the commencement of a widened outlet-chamber $c$, which is adapted to contain a larger quantity of water than the inlet-chamber. Between these two chambers is arranged a passage $b$, which communicates at its lower portion with the chamber $a$ and at its upper portion with the chamber $c$. The lower orifice of this passage is separated from the bottom of the trap by a space approximately equal to the width of the chamber $a$, while the upper orifice is situated above the level of the discharge-orifice from the chamber $c$.

From the upper wall of the trap a tongue or plate $d$ extends within the chamber $c$, and at the highest and lowest points of the trap are provided apertures $e\ e$, which permit of ready access to the inner parts for the purpose of cleansing or the like and adapted to be closed by suitable screw-covers or the like.

When the siphon is filled to such an extent as to cause the chamber $c$ to overflow and the water contained in the siphon is sucked out or placed in movement owing to a sudden fall of water in the down-pipe or through a drain situated at a lower level or through the sudden admission of a large quantity of water into the drain itself, the water leaves the trap until air is able to enter through the passage $b$, whereupon the siphon action ceases. By this improved construction a sufficient quantity of water always remains in the chamber $c$ to form an efficient water joint in the siphon when the water has again come to rest. Hence the provision of special air-pipes is rendered unnecessary. The tongue or plate $d$ serves an important purpose, as it directs or diverts the water which owing to repeated suction is sucked from the chamber $a$ through the passage $b$ into the chamber $c$, whereas it would otherwise for the greater part be carried into the outlet-passage.

What we claim, and desire to secure by Letters Patent of the United States, is—

1. In a trap or siphon for drains or the like, a casing, an inlet-chamber therefor, a widened outlet-chamber in communication with the lower portion of said inlet-chamber, and a passage intermediate said inlet and outlet chambers, and communicating at its lower portion with said inlet-chamber and at its upper portion with said outlet-chamber, the lower orifice of said passage being separated from the bottom of said casing by a space substantially equal to the width of said inlet-chamber, while the upper orifice of said passage is situated above the level of the discharge-orifice of said outlet-chamber.

2. In a trap or siphon for drains or the like, a casing, an inlet-chamber therefor, a widened outlet-chamber in communication with the lower portion of said inlet-chamber, and a passage intermediate said inlet and outlet chambers, and communicating at its lower portion with said inlet-chamber and at its upper portion with said outlet-chamber, the lower orifice of said passage being separated from the bottom of said casing by a space substantially equal to the width of said inlet-chamber, while the upper orifice of said passage is situated above the level of the discharge-orifice of said outlet-chamber, in combination with a plate depending from the top of said casing into said outlet-chamber, apertures at the upper and lower portions of said casing, and closures for said apertures.

In testimony whereof we have hereunto set our hands, in presence of two subscribing witnesses, this 15th day of January, 1900.

WILHELM KESSELRING.
  EMIL RÖTHENBACHER.

Witnesses:
 ALEXANDER WOOD,
 MAX ADLER.